(12) United States Patent
Udagawa et al.

(10) Patent No.: US 7,311,309 B2
(45) Date of Patent: Dec. 25, 2007

(54) CYLINDER HEAD GASKET

(75) Inventors: Tsunekazu Udagawa, Ichikawa (JP); Yuichi Kinoshita, Utsunomiya (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 84 days.

(21) Appl. No.: 11/067,930

(22) Filed: Mar. 1, 2005

(65) Prior Publication Data

US 2005/0200083 A1    Sep. 15, 2005

(30) Foreign Application Priority Data

Mar. 9, 2004    (JP)    ............................. 2004-065780

(51) Int. Cl.
*F02F 11/00*    (2006.01)
(52) U.S. Cl. ...................... 277/592; 277/593
(58) Field of Classification Search ............... 277/592, 277/593, 600, 601
See application file for complete search history.

(56) References Cited

U.S. PATENT DOCUMENTS

| | | | |
|---|---|---|---|
| 4,739,999 A | 4/1988 | Ishii et al. | |
| 4,834,399 A * | 5/1989 | Udagawa et al. | 277/592 |
| 4,898,396 A * | 2/1990 | Udagawa | 277/592 |
| 5,054,795 A * | 10/1991 | Udagawa et al. | 277/593 |
| 5,205,569 A * | 4/1993 | Udagawa et al. | 277/592 |
| 5,255,926 A * | 10/1993 | Udagawa | 277/595 |
| 5,490,681 A * | 2/1996 | Plunkett et al. | 277/592 |
| 5,582,415 A * | 12/1996 | Yoshida et al. | 277/592 |
| 5,988,650 A * | 11/1999 | Plunkett | 277/593 |
| 6,056,295 A * | 5/2000 | Udagawa | 277/595 |
| 6,089,572 A * | 7/2000 | Plunkett | 277/592 |

FOREIGN PATENT DOCUMENTS

| | | |
|---|---|---|
| EP | 0 508 017 A1 | 10/1991 |
| JP | 01211660 | 8/1989 |

* cited by examiner

*Primary Examiner*—Patricia Engle
*Assistant Examiner*—Gilbert Lee
(74) *Attorney, Agent, or Firm*—Manabu Kanesaka

(57) ABSTRACT

A cylinder head gasket for an internal combustion engine is formed of a first metal plate extending substantially throughout an entire area of the gasket. The metal plate includes a base portion, at least one hole corresponding to a cylinder bore of the engine, a curved portion for defining the at least one hole, and a flange extending from the curved portion to be located above the base portion. A plated layer formed of soft metal is disposed on at least one surface of the base portion, curved portion and flange of the first metal plate facing outwardly of the gasket to thereby form a sealing portion by the plated layer.

4 Claims, 1 Drawing Sheet

CYLINDER HEAD GASKET

BACKGROUND OF THE INVENTION

The present invention relates to a cylinder head gasket to be interposed between a cylinder head and a cylinder block of an internal combustion engine for sealing therebetween.

Conventionally, a metal laminate type cylinder head gasket formed by laminating a plurality of metal plates has been widely used, wherein a turning portion for increasing sealing ability is formed around a combustion hole in laminated metal plates corresponding to a combustion chamber of a cylinder block, and a coating layer is formed on a part of the turning portion where a sealing surface pressure is applied for obtaining a surface pressure at the time of tightening.

However, in this kind of cylinder head gasket, when a high sealing surface pressure is repeatedly applied to the turning portion, the coating layer at the turning portion may be cracked or peeled off. Therefore, it is difficult to surely provide a sealing surface pressure.

The technical features of the invention are to eliminate problems of forming cracks in the coating layer and peeling of the coating layer at the turning portion around the combustion chamber where high surface pressure is applied, and to provide a cylinder head gasket to which a stable micro seal can be formed while securely holding a sealing surface pressure at the turning portion.

Further objects and advantages of the invention will be apparent from the following description of the invention.

SUMMARY OF THE INVENTION

In order to solve the above problems, a cylinder head gasket of the invention is formed of a plurality of metal plates laminated together and includes a combustion hole corresponding to a combustion chamber of a cylinder block. A first metal plate forming the above gasket is formed by a steel plate with a plated layer of soft metal on at least one surface thereof. The first metal plate is folded around the combustion hole such that the plated layer faces outwardly, to thereby form a folded portion or flange to which a surface pressure for sealing is applied. A sealing portion around the combustion hole is made by the plated layer at front and rear surfaces at the folded portion.

In the above cylinder head gasket, a second metal plate is laminated outside the folded portion around the combustion hole of the first metal plate, and a seal coating is formed at a necessary portion on the outer surface of the metal plate outside the folded portion. On the other hand, a second metal plate is laminated outside the folded portion around the combustion hole of the first metal plate, and another metal plate is further laminated to be held by the folded portion of the first metal plate. A seal coating may be formed at a necessary portion on the outer surface of the metal plate outside the folded portion.

Further, in a preferred embodiment of the invention, a metal plate laminated on the first metal plate and located at a side opposite to the first metal plate is formed of spring steel, and the plated layer is made by aluminum or alloy thereof.

In the cylinder head gasket with the structure as stated above, the plated layer of the first metal plate is located on the front and rear sides at the folded portion around the combustion hole to which high surface pressure is applied. Thus, a stable micro seal can be made at the folded portion by using affinity of the plated layer, and it is possible to surely obtain a sealing surface pressure.

DETAILED DESCRIPTION OF PREFERRED EMBODIMENTS

Figure 1:
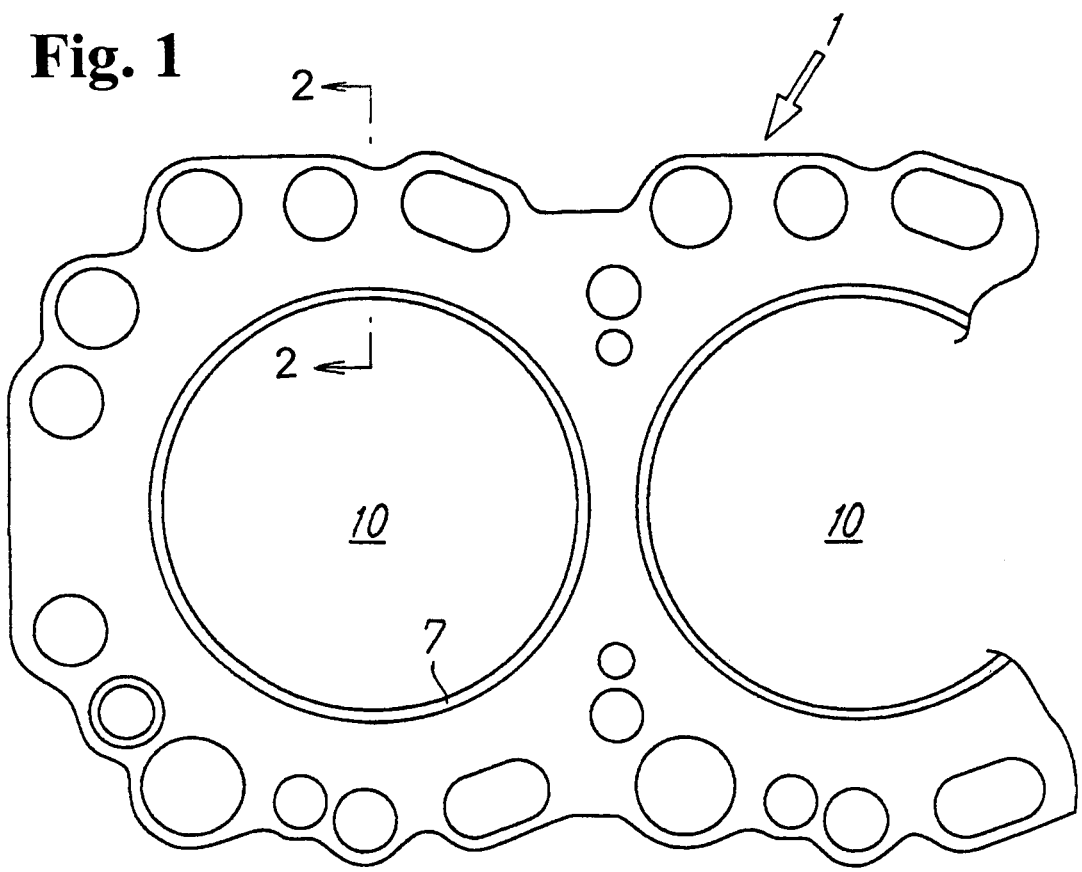
FIG. 1 is a partial plan view of an embodiment of the invention.
Figure 2:
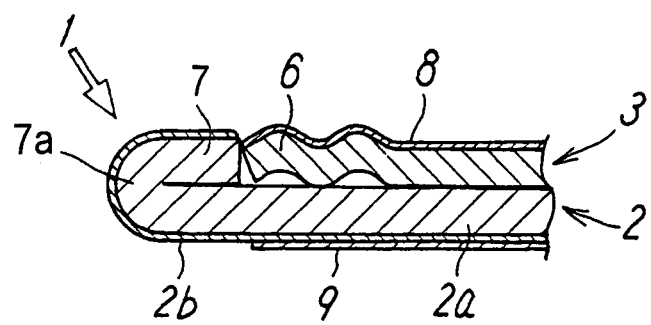
FIG. 2 is a cross sectional view (first embodiment) taken along line 2-2 in FIG. 1.

FIGS. 1 and 2 show a first embodiment of a cylinder head gasket of the invention.

The cylinder head gasket 1 is interposed between a cylinder head and a cylinder block of various internal combustion engines. The gasket is formed by laminating first and second metal plates 2, 3, which are formed with combustion holes 10 corresponding to combustion chambers of the cylinder block.

The first metal plate 2 is formed by a steel plate, for example ulster steel plate, provided on at least one surface with a plated layer 2b of soft metal, such as aluminum or its alloy. Also, the first metal plate 2 is folded around a combustion hole 10, i.e. at a curved portion 7a, such that the plated layer 2b faces outwardly, to thereby form a folded portion or flange 7 to which seal surface pressure is applied. Namely, the first metal plate 2 includes a base portion 2a, curved portion 7a, and flange 7. A sealing portion around the combustion hole 10 is formed by the plated layer 2b made of soft metal on the front and rear outer surfaces at the folded portion. The soft metal may be made by, not only aluminum type metal, but also various metals suitable for micro seal around the combustion hole 10.

Also, a second metal plate 3 is laminated on the first metal plate 1 outside the folded portion 7 around the combustion hole 10. The second metal plate 3 is made by spring steel (for example SUS3001), and includes beads 6 at a portion close to the folded portion 7 of the first metal plate 2. Also, coating layers 8, 9 for sealing are provided on an outer surface of the second metal plate 3 and an outer surface of the first metal plate 2 outside the folded portion. The coating layers 8, 9 for sealing may be formed entirely on the outer surfaces of both metal plates or partly on necessary portions of the metal plates.

Incidentally, in FIG. 1, a plurality of holes arranged around the combustion holes 10 includes holes for flowing water or oil or bolts for tightening.

In the cylinder head gasket 1 having the structure as described above, the plated layer 2b on the first metal plate 2 is located on the upper and rear outer surfaces of the folded portion around the combustion hole 10 to which high surface pressure is applied. Thus, the peeling and crack are suppressed by effectively utilizing the affinity or contacting ability of the plated layer 2b, and micro seal is formed stably at the folded portion, so that the sealing surface pressure is surely obtained.

In the above first embodiment, the gasket 1 is formed of the first and second metal plates 2, 3, but the gasket is not limited thereto.

Figure 3:
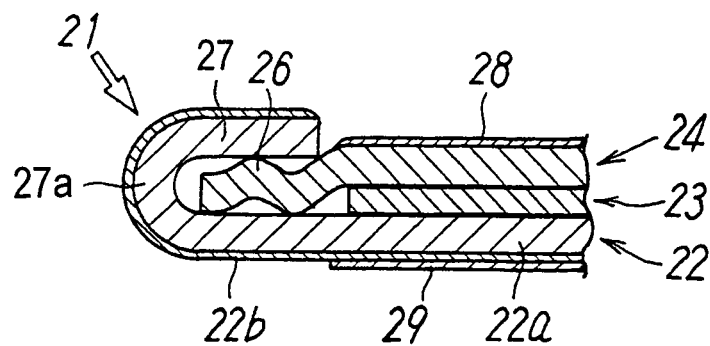
FIG. 3 is a cross sectional view of a second embodiment, similar to FIG. 2.

FIG. 3 shows a second embodiment laminating three metal plates, which is cut at a portion similar to that shown in FIG. 2.

The cylinder head gasket 21 has a basic structure similar to that of the first embodiment, but three metal plates are laminated. Namely, the gasket 21 comprises a lower metal plate 22 substantially same as the first metal plate 2 of the first embodiment, an intermediate metal plate 23 laminated thereon, and an upper metal plate 24 retained in a folded portion 27 of the lower metal plate 22.

The lower metal plate 22 is formed by a steel plate, for example ulster steel plate, provided on at least one surface with a plated layer 22b of soft metal, such as aluminum or its alloy. The lower metal plate 22 is folded around the combustion hole 10, i.e. at a curved portion 27a, such that the above plated layer 22b faces outwardly to thereby form a folded portion 27 to which sealing surface pressure is applied. Namely, the lower metal plate 22 includes a base portion 22a, the curved portion 27a and the flange 27. A sealing portion is formed by the plated layer 22b of the upper and rear outer surfaces at the folded portion.

Also, the intermediate metal plate 23 is laminated on the lower metal plate to be located outside the folded portion 27 around the combustion hole 10.

Further, the upper metal plate 24 is formed of spring steel, and includes a bead 26 located at the folded portion 27.

Also, coating layers 28, 29 for sealing are formed on the outer surface of the lower metal plate 22 and the outer surface of the upper metal plate outside the folded portion. The coating layers 28, 29 may be formed on the entire surfaces of both metal plates, or partially at a necessary portion.

Other structure and operation of the cylinder head gasket of the second embodiment are substantially the same as those of the first embodiment.

The disclosure of Japanese Patent Application No. 2004-065780 filed on Mar. 9, 2004 is incorporated herein as reference.

While the invention has been explained with reference to the specific embodiments of the invention, the explanation is illustrative, and the invention is limited by the appended claims.

What is claimed is:

1. A cylinder head gasket for an internal combustion engine, comprising:
    a first metal plate extending substantially throughout an entire area of the gasket, and having a base portion, at least one hole corresponding to a cylinder bore of the engine, a curved portion for defining the at least one hole, and a flange extending from the curved portion to be located above the base portion,
    a plated layer formed of soft metal and disposed on one surface of the base portion, curved portion and flange of the first metal plate to face outwardly of the gasket to thereby form a sealing portion by the plated layer,
    a second metal plate disposed on the base portion where the plated layer is not deposited, said second metal plate having a bead located on the base portion to surround the at least one hole for providing a resilient surface pressure thereat, and
    a first coating layer disposed on an outer surface of the second metal plate and a second coating layer disposed on an outer surface of the plated layer, said first and second coating layers being placed laterally outside the flange.

2. A cylinder head gasket according to claim 1, wherein said second metal plate includes an inner portion located between the flange and the base portion, said bead being located at the inner portion.

3. A cylinder head gasket according to claim 2, further comprising a third metal plate disposed between the base portion and the second metal plate outside the flange.

4. A cylinder head gasket according to claim 3, wherein said second metal plate is formed of spring steel.

* * * * *